United States Patent
Carr et al.

(10) Patent No.: US 6,519,264 B1
(45) Date of Patent: Feb. 11, 2003

(54) RATE MONITORING OF CONNECTIONS IN A COMMUNICATIONS NETWORK USING HISTORY BUFFER

(75) Inventors: David W. Carr, Nepean (CA); Jason T. Sterne, Ottawa (CA); Denny L. S. Lee, Kanata (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/298,788

(22) Filed: Apr. 26, 1999

(30) Foreign Application Priority Data

May 28, 1998 (CA) .............................................. 2239060

(51) Int. Cl.[7] .......................................... H04L 12/423
(52) U.S. Cl. ...................... 370/449; 370/232; 370/235; 370/395.72; 370/429; 729/224
(58) Field of Search ................................ 370/229, 230, 370/231, 232, 233, 235, 236, 253, 433, 310.1, 346, 449, 384, 395.1, 395.7–395.72, 422, 429, 450; 375/224, 225, 242, 371; 709/224, 227

(56) References Cited

U.S. PATENT DOCUMENTS

| | | | | |
|---|---|---|---|---|
| 5,010,329 A | * | 4/1991 | Nagakura | 370/449 |
| 5,402,412 A | * | 3/1995 | Duffie et al. | 370/253 |
| 5,638,360 A | * | 6/1997 | Sugawara | 370/253 |
| 5,654,963 A | * | 8/1997 | Abe et al. | 370/234 |
| 5,673,266 A | * | 9/1997 | Li | 370/320 |
| 5,878,063 A | * | 3/1999 | Kawasaki et al. | 370/242 |
| 5,974,237 A | * | 10/1999 | Shurmer et al. | 709/223 |
| 6,018,515 A | * | 1/2000 | Sorber | 370/229 |
| 6,167,030 A | * | 12/2000 | Kilkki et al. | 370/236 |
| 6,292,466 B1 | * | 9/2001 | Droz | 370/232 |
| 6,317,234 B1 | * | 11/2001 | Quayle | 340/3.51 |

* cited by examiner

Primary Examiner—Hassan Kizou
Assistant Examiner—David Odland (74) Attorney, Agent, or Firm—Blake, Cassels & Graydon LLP; Alfred A. Macchione (57) ABSTRACT

There is provided a method and device for measuring a rate of message element traffic over a message path in a communications network. The path includes at least one connection and is associated with a maximum rate of transmission. The path is periodically polled for transmission of a message element, the polling being performed at a polling rate associated with polling intervals which are at least as frequent as the maximum rate of transmission. If transmission of a message element is detected during a polling interval, a running count of such detection is incremented, the running count of detection being associated with the connection over which the message element was detected. If transmission of a message element is not detected, a running count of such non-detection is incremented, the running count of non-detection being associated with inactivity of the message path. During each polling interval, an oldest stored value is retrieved from a memory which includes a preselected number of stored values that correspond to an equal number of most recent sequential events of detection and non-detection. Each stored value which represents an event of detection corresponds to an identifier denoting the connection over which the message element was detected. Each stored value which represents an event of non-detection corresponds to an identifier denoting inactivity of the message path. Following retrieval during each polling interval, the running count of detection associated with the connection corresponding to the identifier of the retrieved value is decremented if the retrieved value represents an event of detection. The running count of non-detection is decremented if the retrieved value represents inactivity. The retrieved value is thereafter replaced with a value corresponding to an identifier which denotes the connection over which the message element was detected if transmission was detected. Otherwise the retrieved value is replaced in the memory with a value corresponding to an identifier which denotes inactivity if transmission was not detected. The foregoing steps are repeated for so long as the measurement is undertaken. The rate of message element traffic over a connection of the message path is proportional to the running count of detection associated with the connection.

29 Claims, 6 Drawing Sheets

RATE MONITORING OF CONNECTIONS IN A COMMUNICATIONS NETWORK USING HISTORY BUFFER

FIELD OF THE INVENTION

The present invention relates generally to communications networks and more particularly, to a method and apparatus for monitoring the rate of one or more connections of message, cell or frame traffic in such networks.

BACKGROUND OF THE INVENTION

In many instances, it is necessary or desirable to measure the rate of transmission of a message stream at a specific measurement point in a communications network. Rates may be measured on the aggregate of several connections or at the level of individual connections. These rate measurements may in turn be used to determine the activity state of a connection, for instance for bandwidth allocation or feedback control purposes.

In the Asynchronous Transfer Mode (ATM) networking protocol, multiple classes of communications service have been standardized. The ATM Forum Traffic Management Working Group has defined five service categories for cell transmission which are distinguished by parameter sets used to describe source behaviour and quality of service (QoS) guarantees. The service categories are identified as constant bit rate (CBR), real-time variable bit rate (rtVBR), non-real-time variable bit rate (nrtVBR), available bit rate (ABR) and unspecified bit rate (UBR). Traffic management techniques such as flow control are used in communications networks to protect a network from congestion and to achieve network performance or utilization objectives. Flow control in the ABR service category is achieved by arranging for each source node of a network to send special resource management (RM) cells through the network. Each network entity or element, for instance a switch or a node in the network, may indicate its congestion status by writing into the RM cell. The RM cell is then forwarded on to the next network element in the data path. At the destination network element, the RM cell is turned back towards the source. The network entities in the backward data path may mark congestion information into the RM cell, which is ultimately received by the source. The source may then adjust its sending rate in response to the information contained in the received RM cell.

Various mechanisms can be used in order to achieve flow control in a network. These mechanisms can be classified broadly depending on the congestion monitoring criteria used and the feedback mechanism employed. The feedback mechanisms are either binary in nature or may calculate an explicit rate of transmission. In binary flow control methods, a source of message transmission may receive feedback information to either increase its rate of transmission or decrease its rate of transmission depending on the instantaneous traffic flows at each contention point in the network. In explicit rate (ER) feedback schemes, an actual explicit rate of transmission for the connection will be determined by the network element or node and this information will be sent to the source of message transmission. This explicit rate of transmission is calculated at periodic intervals which may not necessarily be equal to one cell time. Examples of ER mechanisms known to those skilled in this art are the Enhanced Proportional Rate Control Algorithm (EPRCA) and two congestion avoidance schemes, namely Explicit Rate Indication for Congestion Avoidance (ERICA) and Congestion Avoidance Using Proportional Control (CAPC). While it is generally thought that binary feedback schemes may sometimes suffer from unfairness problems depending on the network topology and on the source and destination behaviour employed, the objective of ER algorithms is to allocate bandwidth at each link in the network so that the link is fully utilized and a fair distribution of bandwidth between connections is achieved.

Typically, basic rate measurements in communications networks are conducted as follows. Upon the arrival of a cell at a measurement point the current time is recorded, for instance by means of a time stamp. The time stamp associated with the arrival of the last preceding cell is then subtracted from the current time. This measure of inter-cell timing is extremely noisy, and is very sensitive to cell delay variation induced by buffering and cell scheduling throughout the network. As explained below, it is usual that some type of signal processing must be performed on the raw timing measurements in order to arrive at an estimate of the transmission rate for a given connection.

Known network architectures will generally apply some form of traffic shaping at the source of message transmission so as to enforce a constant cell inter-departure time. However, as a result of the effect of various queuing delays encountered along the message path, random variations to the intended inter-departure times will likely be introduced. These random variations may be modelled as fixed times to which a noise quantity or jitter has been added. Thus, if m is the intended constant cell inter-departure time and X is the noise quantity associated with a particular rate measurement, the calculation of a per-connection rate thus consists of estimating m from a number of observations or samples of the cell inter-arrival times, as follows:

$$T(1)=m+X(1),\ T(2)=m+X(2), \tag{1}$$

where T is a particular measurement of a cell inter-arrival time.

In the available bit rate (ABR) service category of ATM networking, the mean rate of transmission from a source can be expected to change as a result of dynamic bandwidth allocation and feedback control. Therefore, a given source of message transmission may initially transmit at a mean rate associated with an inter-departure time m, but may be instructed during message transmission to transmit at a higher rate associated with a cell inter-departure time w. In this scenario, the inter-arrival times become:

$$T(1)=m+X(1),\ T(2)=m+X(2), \ldots, T(n)=m+X(n),\ T(n+1)=w+X(n+1),$$

$$T(n+2)=w+X(n+2), \tag{2}$$

where between the $n^{th}$ and $(n+1)^{th}$ cells a change in rate has occurred. One of the problems encountered in rate measurements is that of formulating a method of measurement which can detect such transitions in the mean rate of transmission.

Heretofore, three principal rate measurement methods which are based upon corresponding filtering techniques have been utilized in the monitoring of transmission rates in communications networks. Generally, the rate R associated with a network connection is defined as the inverse of the inter-arrival time between two cells over a connection, provided the connection produces such cells without any jitter. As mentioned previously, all the connections in an ATM network can experience some jitter when traversing through a series of network nodes. Thus, rate measurement methods have to employ some type of averaging technique to smoothen this jitter. One can employ a low pass filter for such averaging. The three known methods of rate measurement which use a low pass filter can be broadly classified as rate filtering (RF) methods, time-interval filtering (TIF) methods and modified rate filtering (MRF) methods.

In typical rate filtering methods, a low pass filter is used to filter the inverse of cell inter-arrival times. The connection rate according to these methods is determined as follows:

$$Rate(k) = (1-\alpha) \cdot Rate(k-1) + \alpha \cdot \left(\frac{1}{\Delta t}\right) \quad (3)$$

where:

Rate(k) is the rate of the connection being monitored at the $k^{th}$ cell arrival point;

$\Delta t$ is the inter-arrival time between the $k^{th}$ and $k-1^{th}$ cells; and $\alpha$ is the filter gain factor.

One technique of rate filtering is the finite impulse response (FIR) filter. In this technique, a weighted average is maintained over a constant number of most recent timing sample points. In general terms, the FIR filter as applied to input rate monitoring would assume the following form:

$$R_n = \beta \cdot R_{n-1} + (1-\beta)/\Delta t \quad (4)$$

where:

$R_n$ is the new estimated rate at time n;

$R_{n-1}$ is the previous estimated rate at time n−1;

$\beta$ is a pre-calculated constant controlling the weight of previous samples, typically set to 0.98; and $\Delta t$ is the elapsed time between the previous sample at time $t_{n-1}$ and the current sample at time $t_n$.

It is generally thought that the FIR method is effective in measuring input rates for actively transmitting sources on a network. However, when a source becomes idle, it is necessary to detect that cell arrival has terminated at the point of measurement. In order to do so, a background process is usually required. The background process will cycle through all connections and compare the current time with that of the most recent cell arrival on a per connection basis. Subject to a predetermined criterion, one or more particular connections may be declared idle. For instance, a connection such as an ATM virtual circuit may be declared inactive when its transmission rate falls significantly below the minimum cell rate (MCR) of the connection.

In time-interval filtering methods, a low pass filter is again used. In these methods the low-pass filter is applied directly to the cell inter-arrival times as opposed to being applied to the inverse of the cell inter-arrival times as is the case with the rate filtering methods described above. The connection rate is determined as the inverse of this filtered inter-arrival time, as follows:

$$TI(k) = (1-\alpha) \cdot TI(k-1) + \alpha \cdot \Delta t \quad (5)$$

$$Rate(k) = \frac{1}{TI(k)} \quad (6)$$

where:

TI(k) is the filtered cell inter-arrival time;

Rate(k) is the rate of the connection at the $k^{th}$ cell arrival point;

$\Delta t$ is the inter-arrival time between the $k^{th}$ and $k-1^{th}$ cells; and $\alpha$ is a filter gain factor.

One technique of time-interval filtering is the infinite impulse response filter (IIR). In the IIR methodology for rate measurement, a smoothed version of the inter-arrival cell times is derived. This smoothing is again achieved by means of a low pass filter. Specifically, the following expression can be used to implement the method:

$$y(n+1) = (1-c) \cdot y(n) + c \cdot T(n+1) \quad (7)$$

where:

y(n) is the estimate of the mean arrival time at the arrival of the $n^{th}$ cell;

y(n+1) is the filtered cell inter-arrival time;

c is a filter factor, such that 0<c<1; and

T(n+1) is the inter-arrival time between cells n and n+1.

In IIR methods the closer c is to a value of 0, the sharper will be the filter. When a change from an inter-arrival time of m to w takes place, the mean arrival times y will begin to track the new mean cell inter-arrival time w. The estimate of the arrival rate over a virtual connection (VC) according to this method is thus given by $$VC_{rate} = 1/y(n) \quad (8)$$

The IIR method described above is relatively easy to implement and requires storing only one number per measured connection. However, the above calculations must be done at every cell arrival at the measurement point. As well, in order to detect a transition from an active state to an inactive state for a connection, background processing is used to check the current arrival time against the time of the last cell arrival. Where this difference is greater than a certain fixed threshold, the particular connection is declared inactive. For instance, if the calculated transmission rate $VC_{rate}$ for a connection is less than a fraction f of the minimum cell rate MCR, the connection may be declared inactive, i.e. where $VC_{rate} < f \cdot MCR$. The first cell inter-arrival time (namely T(0)) can be used as the initial condition for the above filter.

Modified rate filtering methods are a variant of the rate filtering methods described above. In modified rate filtering methods, the connection rate is determined generally in the following manner:

$$Rate(k) = (1-\alpha) \cdot Rate(k-1) + \alpha \cdot \left(\frac{N-1}{\Delta T}\right) \quad (9)$$

where:

Rate(k) is the rate of the connection at the $k^{th}$ cell arrival point;

$\Delta T$ is the inter-arrival time between the $k+N^{th}$ and $k^{th}$ cells; and $\alpha$ is once again a filter gain factor.

Thus, instead of using the inter-arrival time between every cell, modified rate filtering methods utilize the time to receive N cells instead.

More accurate known methods of input rate monitoring involve keeping track of the mean m(j) and variance Var(j) of the cell rate measurement over time, and using hypothesis testing for detecting rate changes. In turn, such hypothesis testing is also used to detect the inactivity of a connection. Hypothesis testing methods for input rate measurements typically assume that the distribution of the jitter X is nearly Gaussian and that the mean square variation of the jitter is nearly constant and is independent of the mean cell rate. If this assumption is correct, it can be shown that the probability of the inter-arrival time T being either greater than (1.95996s+m) or less than (−1.95996s+m) is 5%, where s is the standard deviation of the jitter and m is the inter-arrival time. Thus, it can be declared that a change in transmission rate has occurred if a certain value of T falls outside this statistical range. This method assumes that the estimates of m and s are available. In what follows, three different examples of hypothesis testing methods are examined. The choice among the estimatory equations provided in Examples I, II or III below represents a trade-off between computational efficiency and the amount of storage required for variables and intermediate values.

EXAMPLE I

With every cell arrival, the mean inter-arrival time, variance and standard deviation can be updated as:

$$m(j+1)=m(j)+(T(j)-m(j))/(j+1) \quad (10)$$

$$Var(j+1)=(1-1/j)\cdot Var(j)+(j30\ 1)\cdot(m(j+1)-m(j))^2 \quad (11)$$

$$s(j)=Sqrt(Var(j+1)) \quad (12)$$

where:

Var(j) and Var(j+1) are the variances of the cell rate measurement after samples j and j+1, respectively, m(j) and m(j+1) are the mean estimates of the cell rate measurement after samples j and j+1, respectively;

T(j) is the cell inter-arrival time of sample j, namely the current time less the time at which sample j−1 was received;

s(j) is the standard deviation of the inter-arrival time of the measurement after j samples; and Sqrt is the square root function.

This method requires memory storage only for the two most recent values of m(j) and the most recent Var(j) for each connection being monitored.

EXAMPLE II:

Alternatively, one can estimate m and s using sample quantiles. For a sample of n observations of a random variable t the value of the $r^{th}$ quantile (where $0 \leq r \leq 1$) for the variable corresponds to the observation that 100 r% of the observations are smaller than it. Thus, if T(1), T(2), . . . T(n) are the timing observations and T(n,1), T(n,2), . . . T(n,n) are the same values as arranged in ascending order, then the rth empirical quantile is T(n, Ceil(rn)), where Ceil is the ceiling function. The following provides an estimate of the mean m and the standard deviation s:

$$m(n)=0.3\cdot T(n, Ceil(n/3))+0.4\cdot T(n, Ceil(n/2))+0.3\cdot T(n, Ceil(2n/3)) \quad (13)$$

$$s(n)=0.7412898\cdot[T(n, Ceil(0.75n))-T(n, Ceil(0.25n))] \quad (14)$$

The greater the number of samples n which are collected, the better will be the estimate of the quantiles that are achieved.

EXAMPLE III

As an approximation to the recursions of Example I above, one can calculate the following filtered values instead:

$$m(r+1)=(1-e)\cdot m(r)+e\cdot T(r+1) \quad (15)$$

$$Var(r+1)=(1-c)\cdot Var(r)+c\cdot(T(r+1)-m(r))^2 \quad (16)$$

where 0<e<1 and 0<c<1. To avoid the implementation of a divide operation, the first recursion of equation (15) above approximately tracks the mean of T(r) and the second recursion of equation (16) above approximately tracks the variance of T(r), so that the extent of deviation of T(r) is approximately tracked by Sqrt (Var(r)). Both recursions can be reset when a change in the transmission rate has been detected. Thus, the measurement process is restarted by assigning the inter-arrival time between the last two cell samples as the value of m(0), and the value of 0 is assigned to Var(0). This restart initialization of the values of m(0) and Var(0) is also applicable to the estimatory method of Example I above.

Several shortcomings associated with known rate algorithms as described above include the fact that some of these methods are sensitive to jitter in the input sample. As well, in the known methods of rate measurement, additional state information may be required per measured connection, in that background processing is utilized in order to determine whether a particular connection is inactive. When such background processing is required, the background task will need access to the same memory as used by the rate measurement process. This may complicate the implementation of rate measurement as a time-shared or dual-ported memory may be required to support the background task. Many of the methods also produce an over estimation of bandwidth, such that the sum of estimated bandwidths across all connections often exceeds the total actual link bandwidth. Other known rate estimation methods may respond to rate changes in a non-linear manner with over-shooting of the actual rate of transmission (see FIG. 5). For instance, when rate increases occur, cell samples will arrive faster with rate calculations being performed more rapidly. This results in nonlinear tracking of the actual rate with over-shooting since the calculated rate will be more heavily influenced by the higher sampling which occurs during such periods of increased cell transmission. Likewise, when a rate reduction occurs, slower arriving cell samples will take much longer to track. Moreover, in the case of FIR type algorithms, unless a negative power of 2 is chosen as the pre-calculated constant β (see equation (4) above), multiplication is required in computing the algorithm. Likewise, the same problem arises with respect to the constants e and c of equations (15) and (16) above. This imposes constraints on the choice of such constants. Lastly, multiple variables and associated memory space are required on a per connection basis in order to record rate estimation with some of the prior art methods.

The present invention provides an alternative method and apparatus for rate monitoring in a communications network which seeks to alleviate or overcome certain of the disadvantages associated with known rate measurement techniques.

SUMMARY OF THE INVENTION

According to a first broad aspect of the present invention there is provided a method of measuring a rate of message element traffic over a message path in a communications network, the message path including at least one connection and being associated with a maximum rate of transmission of message elements thereover, the method comprising the steps of: (a) periodically polling the message path for transmission of a message element, the periodic polling being performed at a polling rate associated with polling intervals which are at least as frequent as the maximum rate of transmission; (b) if transmission of a message element is detected during a said polling interval, incrementing a running count of such detection, the running count of detection being associated with the connection over which the message element was detected; (c) if transmission of a message element is not detected during a said polling interval, incrementing a running count of such non-detection, the running count of non-detection being associated with inactivity of the message path; (d) during each said polling interval, retrieving an oldest stored value from a memory comprising a preselected number of stored values each corresponding respectively to an equal number of most recent sequential events of detection and non-detection resulting from said periodic polling, wherein each stored value which represents an event of detection corresponds to an identifier denoting the connection over which the message element was detected and wherein each stored value which represents an event of non-detection corresponds to an identifier denoting inactivity of the message path; (e) following step (d) and during each said polling interval, decrementing the running count of detection associated with the connection corresponding to the identifier of the retrieved value if the retrieved value represents an event of detection and decrementing the running count of non-detection if the retrieved value represents inactivity of the message path; (f) following step (e) and during each said polling interval, replacing in the memory the retrieved value with a value corresponding to an identifier which denotes the connection over which the message element was detected if transmission of a message element was detected in step (b) and otherwise replacing in the memory the retrieved value with a value corresponding to an identifier which denotes inactivity of the message path if transmission of a message element was not detected in step (c); (g) repeating each of steps (a) through (f) for so long as said measurement is undertaken; and wherein the rate of message element traffic over a connection of the message path is proportional to the running count of detection associated with the connection.

According to a second broad aspect of the present invention there is provided an apparatus for measuring a rate of message element traffic over a message path in a communications network, the message path including at least one connection and being associated with a maximum rate of transmission of message elements thereover, the apparatus comprising: (a) an input port for receiving message elements which are transmitted over the message path; (b) a timer producing a clock rate which is at least as frequent as the maximum rate of transmission; (c) a processor for periodically polling the input port for transmission of a message element, the periodic polling being performed at polling interval which are synchronized to the clock rate of the timer and: (c.1) if transmission of a message element is detected during a polling interval, wherein the processor increments a running count of such detection, the running count of detection being associated with the connection over which the message element was detected; and (c.2) if transmission of a message element is not detected during a polling interval, wherein the processor increments a running count of such non-detection, the running count of non-detection being associated with inactivity of the message path; (d) a memory accessible by said processor and comprising a preselected number of stored values each corresponding respectively to an equal number of most recent sequential events of detection and non-detection resulting from said periodic polling, each stored value which represents an event of detection corresponding to an identifier denoting the connection over which the message element was detected and each stored value which represents an event of non-detection corresponding to an identifier denoting inactivity of the message path, and wherein: (d.1) during each polling interval the processor retrieves an oldest stored value from the memory and decrements the running count of detection associated with the connection corresponding to the identifier of the retrieved value if the retrieved value represents an event of detection and decrements the running count of non-detection if the retrieved value represents inactivity of the message path; (d.2) after decrementing such running count and during the same polling interval, the processor replaces the retrieved value in the memory with a value corresponding to an identifier which denotes the connection over which the message element was detected if transmission of a message element was detected over the input port during the same polling interval and otherwise the processor replaces in the memory the retrieved value with a value corresponding to an identifier which denotes inactivity of the message path if transmission of a message element was not detected over the input port during the same polling interval; and wherein the rate of message element traffic over a connection of the message path is computed proportional to the running count of detection associated with the connection.

According to a third broad aspect of the present invention there is provided a method of measuring a rate of message element traffic over a message path in a communications network, the message path including at least one flow of message element traffic and being associated with a maximum rate of transmission of message elements thereover, the message path being polled periodically for transmission of a message element, the polling being performed at a polling rate associated with polling intervals which are at least as frequent as the maximum rate of transmission, the method comprising the steps of (a) establishing a running count of non-detection of a message element transmitted over the message path, the running count of non-detection representing events of inactivity of the message path for a predetermined number of sequential polling intervals; and (b) for each flow of message element traffic of the message path, establishing a respective ring count of detection of a message element being transmitted therein, each running count of detection representing a number of events of detection of a message element transmitted in a corresponding flow of message element traffic for the predetermined number of sequential polling intervals; and wherein the predetermined number of sequential polling intervals reflects; (b) every polling interval, most recent events of detection and of inactivity of the message path, and wherein the rate of message element traffic in the corresponding flow of message element traffic of the message path for the predetermined number of sequential polling intervals is proportional to the running count of detection for the corresponding flow of message element traffic.

BRIEF DESCRIPTION OF THE DRAWINGS

By way of illustration and not of limitation, preferred embodiments of the present invention will next be described with reference to the following drawings, in which.

DETAILED DESCRIPTION OF PREFERRED EMBODIMENTS

Figure 1:
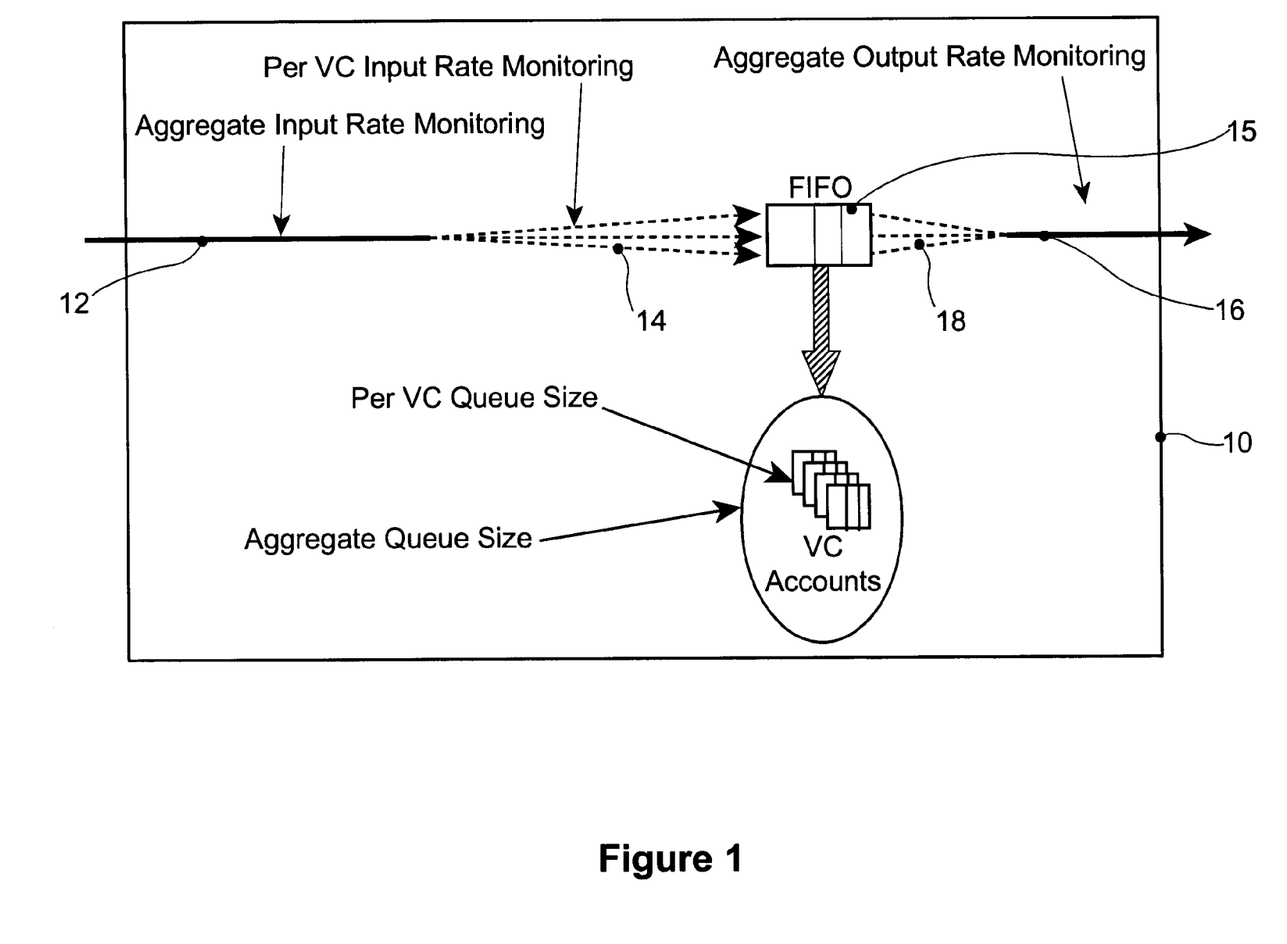
FIG. 1 is a schematic representation of an example of rate monitoring which may be employed in a network element such as a switch, for instance in order to calculate explicit rate information.

With reference to FIG. 1, rate monitoring may advantageously be implemented in a network apparatus 10, for instance in order to provide measurements for supporting explicit rate calculations. The network apparatus 10 may be a switch or the like or a portion thereof It may also be an element dedicated to rate measurements. Typically, data and RM cells may be queued in a memory space, for instance one or more first-in and first-out (FIFO) memory queues 15. A plurality of FIFO queues 15 may be implemented in order to store data and RM cells, corresponding to each connection which traverses the network apparatus 10. Arriving cells are received at input port 12, over which a plurality of virtual circuits or virtual connections 14 are carried. Likewise, an egress port 16 is utilized to transmit cells from the FIFO queues 15, and a plurality of virtual connections or virtual circuits 18 are carried thereby. For the purposes of computing explicit rate information, recourse may be had to the monitoring of the aggregate input rate of cells received over ingress port 12, or a per-VC input rate monitoring based on the cells carried by individual virtual circuits or virtual connections 14. By the same token, output rate monitoring may be desired in the aggregate over egress port 16 or on a per-VC basis based on each of the virtual connections or virtual circuits 18. Moreover, it is typically useful in network flow control to monitor the status of each connection as being either active or inactive. Lastly, it may be useful in explicit rate determinations to monitor the aggregate queue size associated with FIFO queues 15 as well as the queue size attributed to each individual virtual circuit or virtual connection.

Figure 2:
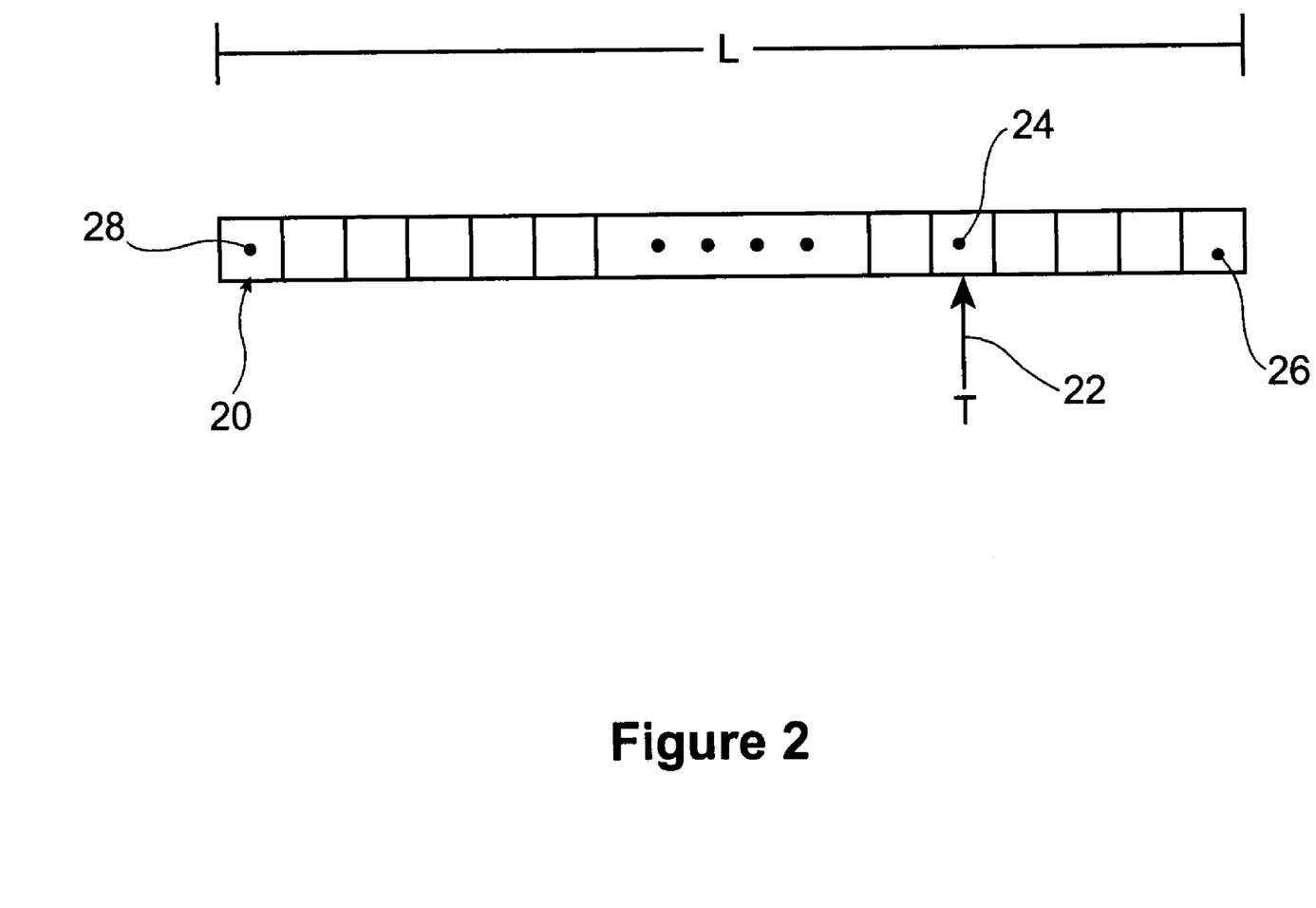
FIG. 2 is a representation of a history buffer for use with the method of rate measurement according to one embodiment of the method according to the present invention.

The method of rate measurement according to the present invention maintains an average over a finite number of most recent sample points collected within a constant period of time. Thus, the invention may be conceptualized as sampling a transmission steam over a constant time width sliding window. With reference to FIG. 2, the method of rate monitoring uses a buffer 20 of length L and containing L elements from 0 to L-1. The buffer 20 is associated with a particular line or port that is being monitored. A pointer 22 is used to indicate a current position along the buffer 20. The pointer 22 identifies a particular element 24 of the buffer 20, which corresponds to the oldest cell sample received from the line or port being monitored. Each of the elements 24 of the buffer 20 holds a connection identifier for samples received from the line or port in question and, in this sense, the buffer 20 acts as a history buffer which maintains the most recent L sequential events from sampling. The connection identifier may be the vc number for the connection, by way of example. An index T for the pointer 22 is incremented to the next sequential position along the buffer 20 by a fixed clock rate, which is generally set to be at least as frequent as the maximum link rate or line rate associated with the link or port. Preferably, the fixed clock rate is chosen so that each clock step occurs at a rate that is just slightly greater than the highest possible cell arrival rate over the connection being monitored.

For each connection associated with the link or port being monitored, a count variable is used to record the number of cells that are stored in the buffer 20 for that connection. If a cell is detected as being received or transmitted by the line or port, the corresponding connection identifier for the cell is placed in the buffer 20 at the current position of pointer 22 along the buffer. Otherwise, if no cell is detected as having been received or transmitted during the fixed rate clock interval by which pointer index T is incremented, an idle identifier such as a value of 0 is placed in the buffer 20 at the current position of pointer 22. Where a cell is detected as having been received or transmitted, the count variable associated with the connection of the received or transmitted cell is incremented. If a previous connection identifier exists in the current position of pointer 22, the corresponding count variable associated with the previous connection identifier will be decremented. If the count variable for a given connection being monitored transitions from a value of 1 to a value of 0,the connection can be declared inactive if on the other hand the count variable transitions from a value of 0 to a value of 1, the connection can be declared active.

Figure 2A:
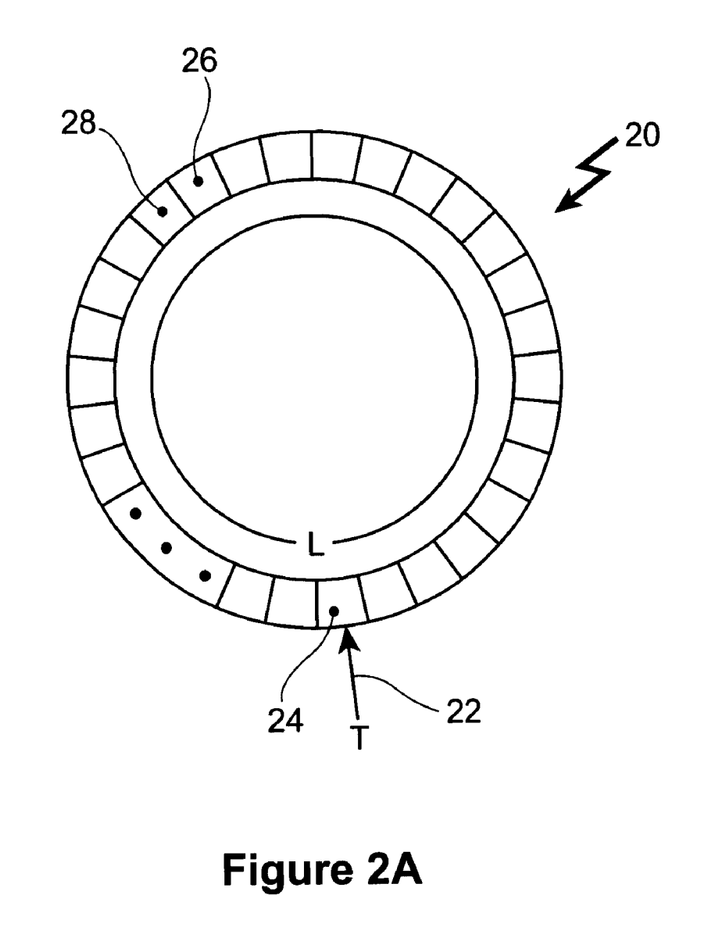
FIG. 2A is another representation of the history buffer of FIG. 2 conceptualized by way of a ring format rather than by way of a linear array.

Thus, based on the foregoing description, at any time during monitoring the number of connection identifiers in the ring buffer which belong to each connection of the line or port is recorded as an estimation of the connection rate. In this manner, the values associated with each count variable are equivalent to low-pass filtered rates. A simple conversion between the value of a count variable and the associated rate is as follows:

$$\text{Rate} = \text{count variable} * \text{PollingRate}/L \quad (17)$$

where the variable PollingRate corresponds to the fixed clock rate of polling over the line or part being monitored. Rather than resorting to arithmetic operations, the foregoing conversion from count variable to associated rate may be performed via a lookup table method as known to those skilled in this art. As well, instead of adding or subtracting 1 to the count variables mentioned above, the quantity PollingRate/L may be used directly to increment or to decrement a rate variable rather than a count variable, thereby avoiding any conversion between the count variable and associated rates. Also, to avoid multiplication and division operations, whenever a rate needs to be derived from a count this may be performed by means of a lookup table of length L.

Where the pointer 22 is advanced to the end element 26 of buffer 20, the pointer 22 thereafter reverts to the beginning element 28 of buffer 20. This may preferably be accomplished by use of the technique of a modulo-N counter, namely a counter in which the number represented reverts to a value of 0 in its sequence of counting after reaching a maximum value of N−1. This counter technique is well-known to those skilled in this art. By utilizing such a counter for pointer 22, the buffer 20 behaves as though it were a continuous ring of elements 24 as opposed to a finite linear array (FIG. 2A). According to the present invention, the buffer 20 may therefore be referred to as a "ring buffer". Initially, the ring buffer is filled with values of 0 and the count variable for each of the connections being monitored are also initialized to values of 0. An idle count variable is initialized to L, which is equivalent to denoting that the idle connections on the link being monitored consume all of the available link bandwidth.

Figure 3:
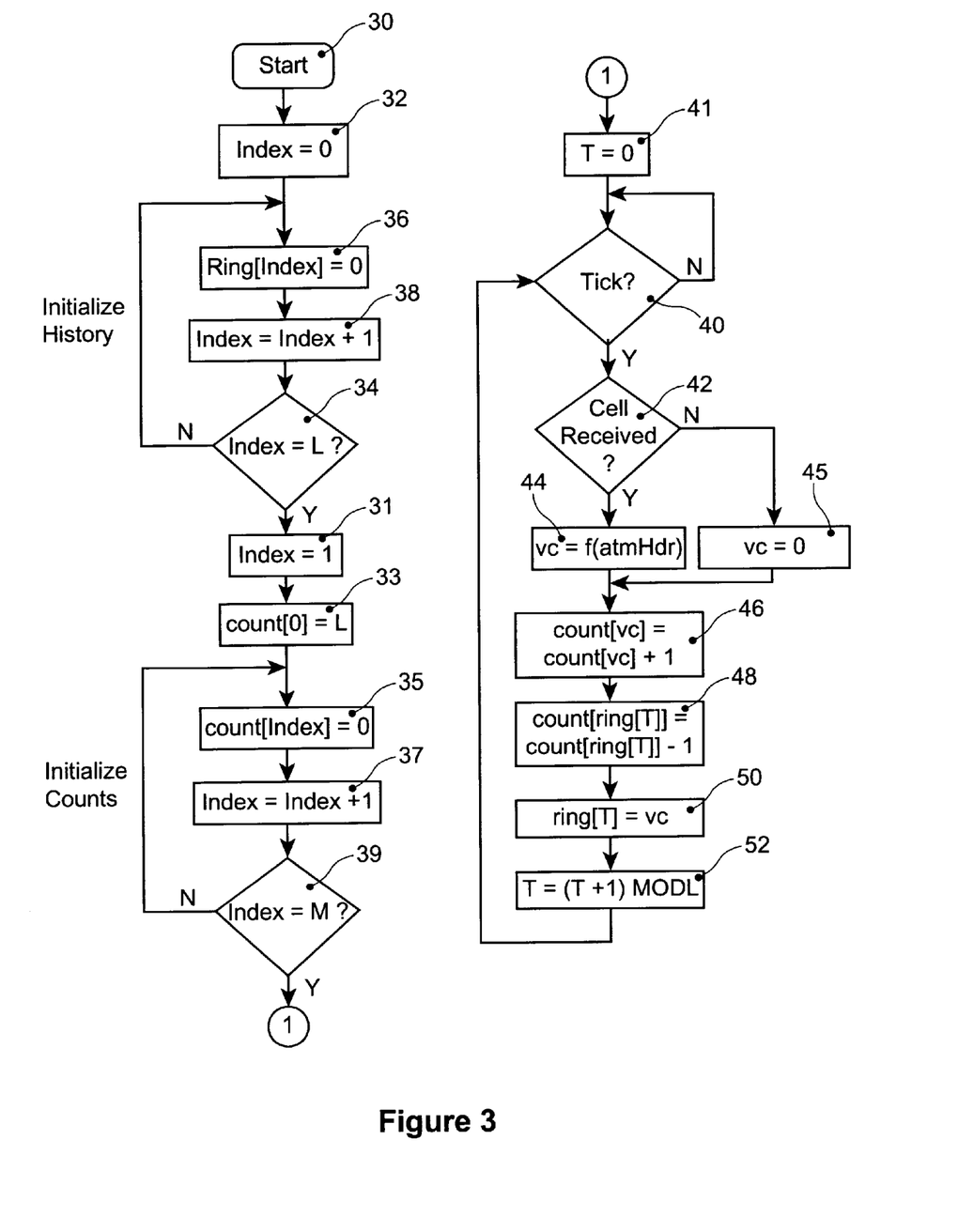
FIG. 3 is a flowchart which illustrates the steps for rate measurement according to the preferred embodiment of the method according to the present invention.

With reference to FIG. 3, the method of rate measurement according to the present invention operates as follows. Beginning with START block 30, an initialization first takes place at block 32. Namely, an Index variable used for initialization purposes is set to a value of 0. Following step 32, the method proceeds to operation 36. Each of the successive elements of buffer 20 are initialized to a value of 0 at steps 36 and 38. The index variable is incremented with each iteration of buffer element initialization until such time as the value of the Index variable attains that of L, denoting that all L elements of buffer 20 have been initialized to a value of 0. The Index variable is tested for a value of L at step 34. If the value of Index attains L, the method proceeds to step 31. If not, initialization of the elements of buffer 20 continues at steps 36 and 38.

At step 31, the value of Index is re-initialized to a value of 1. At step 33, a count variable, count [0], is initialized to the integer value representing the length of buffer 20, namely L. This count [0] value is representative of the initial state of measurement which assumes that all connections are inactive and that all available bandwidth over the link or port being monitored is consumed by such inactive connections. Next, the values of each of the count variables for every connection being monitored are initialized to a value of 0 at step 35. The Index variable is incremented at step 37, and each count variable is successively initialized as explained above until such time as the Index variable attains a value of M, which corresponds to the number of connections being monitored. The value of the Index variable is tested against the value of M at step 39.

Upon completion of initialization as explained above, measurement of connection rates begins at step 41, where the pointer variable F is initialized to a value of 0. This pointer variable reflects the position of pointer 22 along the buffer 20, as explained above, A clock rate is utilized to time the method to poll for the receipt of a cell on the line or port being monitored. As mentioned previously, the clock rate will be set so that it is at least as frequent as the maximum expected rate of cell transmission, and preferably more frequent. This should ensure that all cell arrivals or departures, as the case may be, will be detected by the measurement method. For every tick or timing interval, measured at step 40, if a cell has been detected at step 42, then at step 44 the index denoted vc is assigned a value corresponding to a connection identifier for the detected cell. In the cue of an ATM network, this connection identifier is preferably the ATM header associated with the received cell. The method proceeds to step 46, where the count variable pertaining to the connection associated with the received cell is incremented by a value of 1. Next, at step 48 the count variable pertaining to the connection associated with the connection identifier stored in the particular buffer element denoted by the pointer 22 will be decremented by a value of 1. The connection identifier pertaining to the connection associated with the received cell is then stored in the buffer 20 at the location denoted by pointer 22, as set out at step 50. At step 52, the pointer index T is incremented as previously described by way of a modulo L counter. That is, when the index reflects the position of the last element in the buffer 20, the pointer will revert to a value of 0, thereby reflecting the position of the first element of the buffer 20. The polling and counting process as described above is then repeated at the next time interval of the clock.

If, during a clock interval, no cell is detected as having been received by the port or line being monitored, then at step 45 the value of 0 is assigned to the count variable index vc. Steps 46, 48, 50 and 52 are next executed as previously described. The value of the count variable which is associated with the count variable index having a value of 0 is indicative of the proportion of bandwidth that is inactive at any point in time during the monitoring of a line or port. As well, where any count variable transitions from a value of 0 to 1 or from a value of 1 to 0 during the incrementing step 46 or decrementing step 48, the particular connection associated with that count variable may be respectively declared active or inactive, as the case may be.

Figure 4:
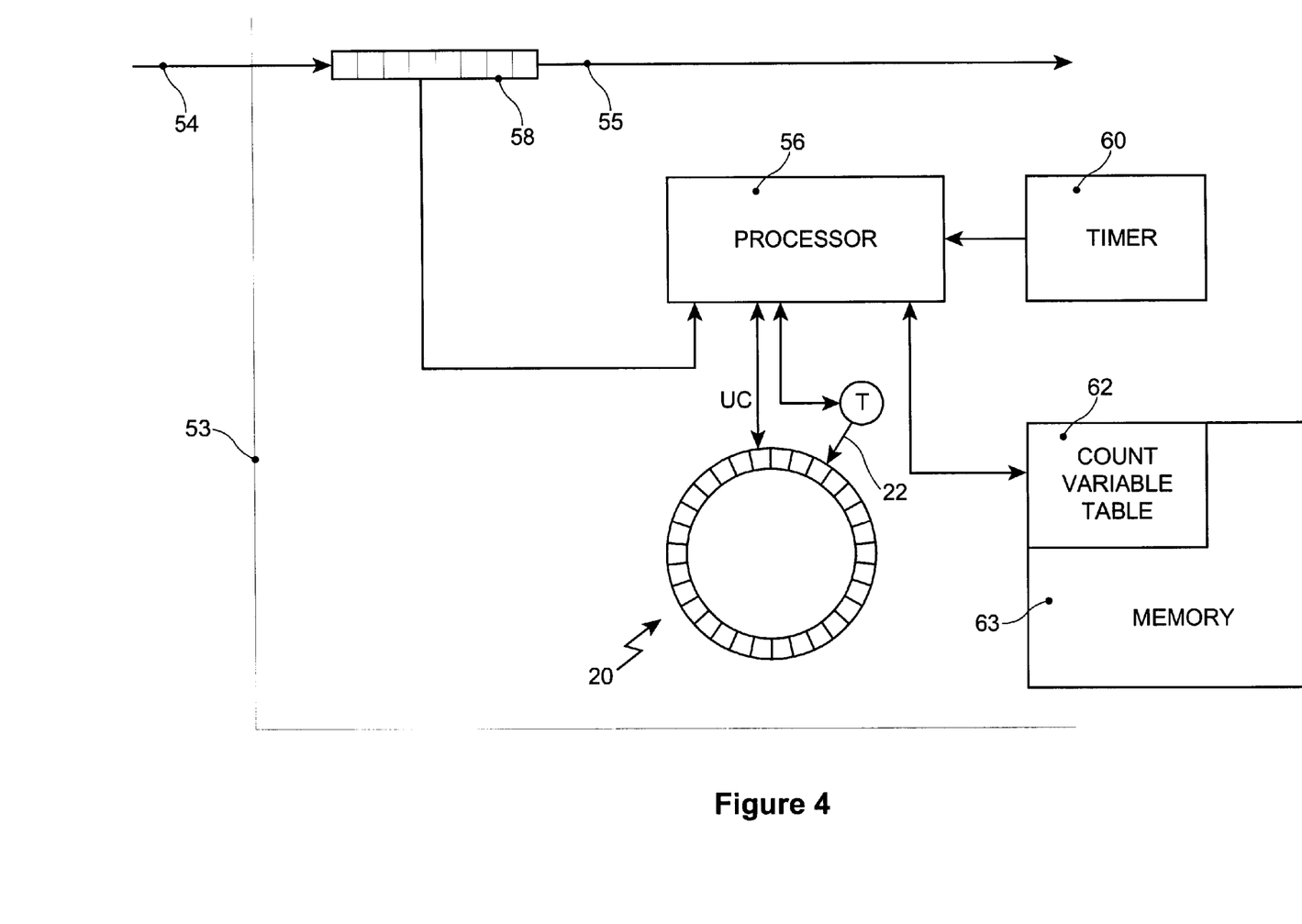
FIG. 4 is a system block diagram representing a network apparatus which implements the method of rate measurement according to the present invention.

Turning now to FIG. 4, a network apparatus 53 which implements the method of rate measurement according to the present invention is next described. The network apparatus may be a switch, some other network element which provides functionality in addition to rate measurement or a hardware module dedicated to such measurement. The network apparatus 53 includes an input port 54 over which one or more connections may be monitored. Cells received by input port 54 may be placed in one or more input queues 58 (only one input queue 58 being shown in FIG. 4). Where the network apparatus 53 is a switch or a network module providing functionality other than rate monitoring, the input queues 58 will preferably be associated with a respective egress line 55 through which the cells may be transported for switching purposes or such other functions.

A processor 56 which is controlled by a timer 60 is preferably utilized to monitor whether or not a cell has been received by the input queues 58 at each timing interval as previously explained. The processor 56 may comprise a microprocessor and associated software to handle the various computations such as those of steps 44, 45, 46, 48, 50 and 52 (FIG. 3) of the method according to the present invention. Those skilled in this art will appreciate that processor 56 may also be implemented by way of a dedicated hardware circuit or an application-specific integrated circuit (ASIC) if desired. In assigning an appropriate connection identifier to the count variable index vc, processor 56 will read such information from a received cell in egress queue 58 and obtain the corresponding current value of the appropriate account variable from the count variable table 62 of memory 63. The processor will also read from and write to ring buffer 20 in order to perform steps 48 and 50 (FIG. 3) of the preferred method. As well, freshly incremented or decremented values of the count variables will be written to table 62 by processor 56. Lastly, the processor 56 will appropriately increment the pointer index T of pointer 22 of the buffer 20.

Those skilled in this art will appreciate that if the buffer 20 is large, the method of computing transmission rates according to the present invention will have large latency and the rate measurement will be very smoothed. The method will therefore approximate the performance of a heavily damped low-pass filter. To measure low rates of transmission, the buffer 20 should be larger. Thus, there will be a compromise in using the method according to the present invention between the buffer size and its response. Those skilled in this art will appreciate that one can use different sized buffers for different ranges of rates. For instance, a shorter duration buffer 20 may be used for measuring aggregate input rates while simultaneously a longer duration buffer 20 may be used when measuring the transmission rates of individualized connections. The method described above may be utilized to track counts for particular aggregates of connections, for instance all connections belonging to a given channel or those associated with a given service category, to name two examples.

The method of rate monitoring according to the present invention has several advantages. First, it is not necessary to employ background processing in order to detect idle connections. The buffer 20 utilized for measurement is similar to a low-pass filter in the sense that the edge rate of the filter may be controlled via the length L of the buffer 20. As mentioned previously, a larger value for L damps the filter response. Those skilled in this art will also realize that the memory consumed by the technique of the present invention requires a single variable in order to record the rate estimation of each connection being measured. Moreover, the method according to the present invention does not require multiplications during computation, other than if it is desired to perform conversions from the count variable values to derive actual transmission rates. Any multiplications required for rate conversions may be precomputed at initialization and stored in a conversion table. Multiplication can be avoided, even when the buffer length L is not chosen as a power of 2. The method according to the present invention also estimates rates on a per-connection basis that in the aggregate reflect the line rate associated with the port or link being monitored. Furthermore, in contrast with known methods of measurement, there is no restriction on the damping factor chosen for the filtering effect, as with the factor P for typical FIR filters. Those skilled in this art will appreciate, however, that the choice of buffer length as a power of 2 may simplify the implementation of the method according to the present invention.

Figure 5:
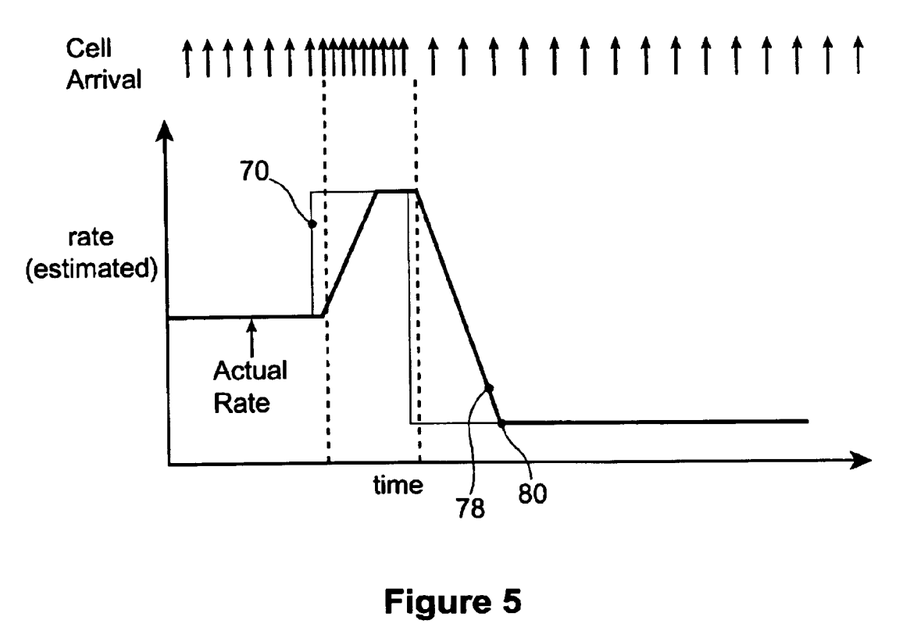
FIG. 5 is a graph representing tracking of an actual rate of transmission using the rate measurement method according to the present invention.

Lastly the method according to the present invention is expected to track rates of transmission in a linear manner. Referring to FIG. 5, plot 70 illustrates the actual rate of transmission of cells under the invention. As shown by plot 78, the actual transmission rate is tracked in a linear fashion without overshooting when estimated according to the method of the present invention. This is because cell sampling occurs at a fixed polling interval, such that measured rates are updated independently of the inter-arrival times found on a connection. Where the cell inter-arrival rate decreases, the estimated rate according to the present invention reduces and converges linearly to the actual rate represented by the plot 70 as at 80.

It should be noted that the sum of the rates of the connections in the invention will never exceed the link rate.

Generally, the present invention has been described herein by way of example only, and those skilled in this art will understand that various modifications of detail can be made to the present invention, all coming within its spirit and scope. While a preferred implementation in a network apparatus 53 has been described above which relates to input rate monitoring, those skilled in this art will readily appreciate that the method and apparatus of rate monitoring according to this invention may likewise be adapted to output rate monitoring or the monitoring of various other lines, ports or physical or virtual connections associated with networks and networking equipment. As well, those skilled in this art will appreciate that while the buffers 20 and 58 have been rendered separately from memory 63, such buffers may be organized within the map of memory space 63. Moreover, although the invention has been described in its preferred embodiments with reference to the monitoring of ATM virtual circuits, the invention can be applied or adapted to rate measurements pertaining to virtual paths or to frame based or message based traffic.

What is claimed is:

1. A method of measuring a rate of message element traffic over a message path in a communications network, the message path including at least one connection and being associated with a maximum rate of transmission of message elements thereover, the method comprising the steps of:
   (a) periodically polling the message path for transmission of a message element, the periodic polling being performed at a polling rate associated with polling intervals which are at least as frequent as the maximum rate of transmission;
   (b) if transmission of a message element is detected during a said polling interval, incrementing a running count of such detection, the running count of detection being associated with the connection over which the message element was detected;
   (c) if transmission of a message element is not detected during a said polling interval, incrementing a running count of such non-detection, the running count of non-detection being associated with inactivity of the message path;
   (d) during each said polling interval, retrieving an oldest stored value from a memory comprising a preselected number of stored values each corresponding respectively to an equal number of most recent sequential events of detection and non-detection resulting from said periodic polling, wherein each stored value which represents an event of detection corresponds to an identifier denoting the connection over which the message element was detected and wherein each stored value which represents an event of non-detection corresponds to an identifier denoting inactivity of the message path;
   (e) following step (d) and during each said polling interval, decrementing the running count of detection associated with the connection corresponding to the identifier of the retrieved value if the retrieved value represents an event of detection and decrementing the running count of non-detection if the retrieved value represents inactivity of the message path;
   (f) following step (e) and during each said polling interval, replacing in the memory the retrieved value with a value corresponding to an identifier which denotes the connection over which the message element was detected if transmission of a message element was detected in step (b) and otherwise replacing in the memory the retrieved value with a value corresponding to an identifier which denotes inactivity of the message path if transmission of a message element was not detected in step (c);
   (g) repeating each of steps (a) through (f) for so long as said measurement is undertaken; and
wherein the rate of message element traffic over a connection of the message path is proportional to the running count of detection associated with the connection.

2. The method of measuring a rate of message element traffic according to claim 1, wherein the memory is a buffer in which each of the stored values is ordered chronologically from the oldest stored value to a most recently stored value, the memory having a pointer which denotes the oldest stored value during each polling interval, the pointer denoting a next oldest sequential stored value in the buffer once the oldest stored value has been retrieved therefrom according to step (d) and has been replaced according to step (e).

3. The method of measuring a rate of message element traffic according to claim 2, wherein the pointer is associated with an index which is incremented to denote the next oldest sequential stored value pursuant to a modulo L counter, where L corresponds to the preselected number of stored values in the buffer.

4. The method of measuring a rate of message element traffic according to claim 2, wherein the buffer is a ring buffer.

5. The method of measuring a rate of message element traffic according to claim 2, wherein the message path comprises a plurality of connections and wherein a like plurality of running counts of detection are provided therefor, each of the connections corresponding respectively to a separate running count of detection.

6. The method of measuring a rate of message element traffic according to claim 5, wherein the communications network is an Asynchronous Transfer Mode (ATM) network and the message elements are ATM cells.

7. The method of measuring a rate of message element traffic according to claim 6, wherein the message path is a virtual path and the connections are virtual connections.

8. The method of measuring a rate of message element traffic according to claim 6, comprising the further step of declaring a connection as being inactive when the running count of detection for the connection transitions from a value of 1 to a value of 0 and of declaring a connection as being active when the running count of detection for the connection transitions from a value of 0 to a value of 1.

9. The method of measuring a rate of message element traffic according to claim 6, wherein the identifier denoting inactivity of the message path is a value of 0.

10. The method of measuring a rate of message element traffic according to claim 9, wherein the value corresponding to the identifier denoting the connection over which the message element was detected is an ATM cell connection identifier and wherein the method further includes the step of reading the ATM cell connection identifier upon such detection of transmission.

11. An apparatus for measuring a rate of message element traffic over a message path in a communications network, the message path including at least one connection and being associated with a maximum rate of transmission of message elements thereover, the apparatus comprising:

(a) an input port for receiving message elements which are transmitted over the message path;

(b) a timer producing a clock rate which is at least as frequent as the maximum rate of transmission;

(c) a processor for periodically polling the input port for transmission of a message element, the periodic polling being performed at polling intervals which are synchronized to the clock rate of the timer and:

(c.1) if transmission of a message element is detected during a polling interval, wherein the processor increments a running count of such detection, the running count of detection being associated with the connection over which the message element was detected; and (c.2) if transmission of a message element is not detected during a polling interval, wherein the processor increments a running count of such non-detection, the running count of non-detection being associated with inactivity of the message path;

(d) a memory accessible by said processor and comprising a preselected number of stored values each corresponding respectively to an equal number of most recent sequential events of detection and non-detection resulting from said periodic polling, each stored value which represents an event of detection corresponding to an identifier denoting the connection over which the message element was detected and each stored value which represents an event of non-detection corresponding to an identifier denoting inactivity of the message path, and wherein:

(d.1) during each polling interval the processor retrieves an oldest stored value from the memory and decrements the running count of detection associated with the connection corresponding to the identifier of the retrieved value if the retrieved value represents an event of detection and decrements the running count of non-detection if the retrieved value represents inactivity of the message path;

(d.2) after decrementing such running count and during the same polling interval, the processor replaces the retrieved value in the memory with a value corresponding to an identifier which denotes the connection over which the message element was detected if transmission of a message element was detected over the input port during the same polling interval and otherwise the processor replaces in the memory the retrieved value with a value corresponding to an identifier which denotes inactivity of the message path if transmission of a message element was not detected over the input port during the same polling interval; and wherein the rate of message element traffic over a connection of the message path is proportional to the running count of detection associated with the connection.

12. The apparatus for measuring a rate of message element traffic according to claim 11, wherein the memory is a buffer in which each of the stored values is ordered chronologically from the oldest stored value to a most recently stored value, the memory having a pointer which denotes the oldest stored value during each polling interval, the pointer denoting a next oldest sequential stored value in the buffer once the oldest stored value has been retrieved therefrom and has been replaced as aforesaid.

13. The apparatus for measuring a rate of message element traffic according to claim 12, wherein the pointer is associated with an index which is incremented to denote the next oldest sequential stored value pursuant to a modulo L counter, where L corresponds to the preselected number of stored values in the buffer.

14. The apparatus for measuring a rate of message element traffic according to claim 12, wherein the buffer is a ring buffer.

15. The apparatus for measuring a rate of message element traffic according to claim 12, wherein the message path comprises a plurality of connections and wherein a like plurality of running counts of detection are provided therefor, each of the connections corresponding respectively to a separate running count of detection.

16. The apparatus for measuring a rate of message element traffic according to claim 15, wherein the communications network is an Asynchronous Transfer Mode (ATM) network and the message elements are ATM cells.

17. The apparatus for measuring a rate of message element traffic according to claim 16, wherein the message path is a virtual path and the connections are virtual connections.

18. The apparatus for measuring a rate of message element traffic according to claim 16, wherein a connection is declared inactive when the running count of detection for the connection transitions from a value of 1 to a value of 0 and wherein the connection is declared active when the running count of detection for the connection transitions from a value of 0 to a value of 1.

19. The apparatus for measuring a rate of message element traffic according to claim 16, wherein the identifier denoting inactivity of the message path is a value of 0.

20. The apparatus for measuring a rate of message element traffic according to claim 19, wherein the value corresponding to the identifier denoting the connection over which the message element was detected is an ATM cell connection identifier and wherein the processor reads the ATM cell connection identifier upon such detection of transmission.

21. The method of measuring a rate of message element traffic according to claim 1, wherein the rate of message element traffic over a connection of the message path is computed as the product of the running count of detection associated with the connection and the quotient represented by the polling rate divided by the preselected number of stored values.

22. The apparatus for measuring a rate of message element traffic according to claim 11, wherein the rate of message element traffic over a connection of the message path is computed as the product of the running count of detection associated with the connection and the quotient represented by the polling rate divided by the preselected number of stored values.

23. A method of measuring a rate of message element traffic over a message path in a communications network,, said message path including at least one flow of message element traffic and being associated with a maximum rate of transmission of message elements thereover, said message path being polled periodically for transmission of a message element, said polling being performed at a polling rate associated with polling intervals which are at least as frequent as said maximum rate of transmission, said method comprising the steps of:

(a) establishing a running count of non-detection of a message element transmitted over said message path, said running count of non-detection representing events of inactivity of said message path for a predetermined number of sequential polling intervals; and (b) for each flow of message element traffic of said message path, establishing a respective running count of detection of a message element being transmitted therein each said running count of detection representing a number of events of detection of a message element transmitted in a corresponding flow of message element traffic for said predetermined number of sequential polling intervals; and wherein said predetermined number of sequential polling intervals reflects, for every polling interval, most recent said events of detection and of inactivity of said message path, and wherein said rate of message element traffic in said corresponding flow of message element traffic of said message path for said predetermined number of sequential polling intervals is proportional to said running count of detection for said corresponding flow of message element traffic.

24. A method of measuring a rate of message element traffic over a message path in a communications network according to claim 23, wherein each said flow of message element traffic is a connection.

25. A method of measuring a rate of message element traffic over a message path in a communications network according to claim 24, wherein said most recent said events of detection and of inactivity of said message path are recorded in a memory respectively as (i) a value indicating non-detection of a message element for a corresponding polling interval of said predetermined number of polling intervals and (ii) a value indicating detection of a message element in a corresponding polling interval of said predetermined number of polling intervals.

26. A method of measuring a rate of message element traffic over a message path in a communications network according to claim 25, wherein said value indicating non-detection of a message element corresponds to an identifier denoting inactivity of said message path and said value indicating detection of a message element corresponds to an identifier denoting the connection over which the message element was detected.

27. A method of measuring a rate of message element traffic over a message path in a communications network according to claim 26, wherein said stop (a) establishes said running count of non-detection based on a number of said identifiers in said memory denoting inactivity of said message path and wherein said step (b), for each said connection, establishes said ring count of detection for said corresponding connection based on a number of said identifiers in said memory denoting said corresponding connection.

28. A method of measuring a rate of message element traffic over a message path in a communications network according to claim 27, said method further comprising the step of:

(c) during a current polling interval, retrieving an oldest stored identifier from said memory;

wherein said running count of non-detection is established during each said polling interval by;

(a1) decrementing said running count of non-detection following said step (c) if said identifier retrieved during said current polling interval represents inactivity of said message path; and (a2) incrementing said running count of non-detection if transmission of a message element is not detected during said current polling interval;

and wherein said running counts of detection are established during each said polling interval by:

(b1) decrementing said running count of detection corresponding to said connection denoted by said retrieved identifier following said step (c) if said identifier retrieved during said current polling interval represents an event of detection; and (b2) incrementing said running count of detection corresponding to said connection in which said message element is transmitted if transmission of a message element is detected during said cue polling interval.

29. A method of measuring a rate of message element traffic over a message path in a communications network according to claim 28, wherein recording said most recent said events of detection and of inactivity of said message path in said memory replace said retrieved identifier in said memory with one of said identifiers (i) and (ii) as aforesaid.

* * * * *